United States Patent

Vollkommer

[11] 3,976,623
[45] Aug. 24, 1976

[54] COPOLYMERS OF 1,2-DIMETHOXY-ETHYLENE AND β-LACTONES OR CYCLIC SIX-MEMBERED RING CARBONATES

[75] Inventor: Norbert Vollkommer, Troisdorf, Germany

[73] Assignee: Dynamit Nobel Aktiengesellschaft, Troisdorf, Germany

[22] Filed: Nov. 8, 1973

[21] Appl. No.: 414,618

[30] Foreign Application Priority Data
Nov. 15, 1972 Germany............................ 2255890

[52] U.S. Cl..................... 260/78.3 UA; 260/30.4 R; 260/32.6 R; 260/32.8 R; 260/33.8 R; 260/33.8 UB; 260/77.5 D
[51] Int. Cl.².......................................... C08G 63/02
[58] Field of Search................ 260/91.1 R, 78.3 UA

[56] References Cited
UNITED STATES PATENTS
| | | | |
|---|---|---|---|
| 2,526,743 | 10/1950 | Gresham........................ | 260/91.1 R |
| 3,190,858 | 6/1965 | Cox et al...................... | 260/78.3 UA |
| 3,231,554 | 1/1966 | Kern............................. | 260/91.1 M |

*Primary Examiner*—Harry Wong, Jr.
*Attorney, Agent, or Firm*—Burgess, Dinklage & Sprung

[57] ABSTRACT

A copolymer of 1,2-dimethoxy ethylene and a cyclic compound having an oxygen atom as a component of the chain, said copolymer having the formula:

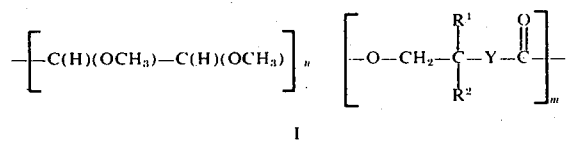

wherein Y is a straight bond or —$CH_2$—O—, $R^1$ and $R^2$ are independently hydrogen or alkyl of 1–4 carbon atoms, $n$ and $m$ an integers $n + m = 10$ to 1,000; a process for such copolymers which comprises contacting 1,2 dimethoxy ethylene under copolymerization conditions with a cyclic organic compound having oxygen in the ring, said compound selected from the group consisting of β-lactones and cyclic six-membered ring carbonates in the presence of an initiator in an amount between 0.1 and 10 mole percent based upon said 1,2-dimethoxyethylene and said cyclic organic compound, which initiator is of the group of halogen containing organoaluminum compounds having the formula $Al(R)_a X_b$ wherein
R is a saturated aliphatic radical of from about 1 to 6 carbon atoms, or phenyl,
X is chlorine or bromine,
$a + b$ are each 1, 1.5 or 2, the sum of $a + b$ being 3.

17 Claims, No Drawings

COPOLYMERS OF 1,2-DIMETHOXY-ETHYLENE AND β-LACTONES OR CYCLIC SIX-MEMBERED RING CARBONATES

BACKGROUND OF THE INVENTION

1. Field of the Invention

This invention relates to copolymers of 1,2-dimethoxyethylene with β-lactones of cyclic six-membered ring carbonates. More particularly, this invention relates to water insoluble copolymers of 1,2-dimethoxy ethylene and β-lactones or cyclic six-membered ring carbonates and to a process for their production. This invention is also directed to the use of the resultant copolymers as a fusion adhesive. Another possible application is in the field of elasticizing agents, e.g. for plastics.

2. Discussion of the Prior Art

In co-pending application, Ser. No. 207,648 now U.S. Pat. No. 3,792,030 of Feb. 12, 1974 there is disclosed the preparation of homopolymers of 1,2-dimethoxyethylene (DMOE) by contacting 1,2-dimethoxyethylene at a temperature in the range of 0° to −80°C with an initiator which is a halogen-containing organoaluminum compound such as diethyl aluminum chloride. Homopolymers of 1,2-dimethoxyethylene which are water-soluble are prepared. These polymers have an osmotic average number molecular weight between about 60,000 and 350,000. A portion of the polymer has a crystalline structure.

It has become desirable to prepare copolymers of DMOE with other organic residues. However, difficulties have been encountered in the preparation of such copolymers. For instance, in one of the earlier cases wherein 1,2-dimethoxyethylene was employed in a copolymerization pure poly-DMOE was obtained. Thus, when it was attempted to polymerize dimethoxyethylene with isobutylene, methylmethacrylate and butadiene, pure poly-DMOE was obtained (see U.S. Pat. No. 2,526,743). The reason for this probably lies in the fact that dialkoxyethylenes, especially dimethoxyethylene are characterized by a violent homopolymerization, especially when Lewis acids are utilized.

Attempts have also been made to form copolymers of monomers which polymerize by undergoing a ring opening with monomers which polymerize with the elimination of an olefinic double bond. One of the first cases of this type of copolymerization involves an attempt to copolymerize trioxane with styrene. Attempts have been made also to prepare copolymers of β-propiolactone and acrylic acid, as well as vinyl compounds. Thus, Okamura et al obtained, in the irradiation of a monomer mixture of β-propiolactone and the vinyl related compound, acrylonitrile, with gamma rays, an insoluble copolymer. See Journal of Polymer Science, Vol. 58, page 925 (1962). Katayama et al succeeded in triggering, with sodium cyanide as the initiator, an anionic copolymerization between β-propiolactone and acrylonitrile. (Journal of Polymer Science A-1, Polymer Chemistry 9 (1971) No. 5, p. 1173).

The cationic polymerization of lactones was said to be especially difficult with monomers exhibiting a very rapid cationic homopolymerization. Thus, attempts have been made for the cationic copolymerization of styrene with β-propiolactone (Ito et al., "Makromolekulare Chem." [Macromolecular Chemistry] 117 (1968), 279). However, with the aid of the initiators employed, especially borontrifluoride etherate, essentially mixtures of the two homopolymers were produced.

Considering the fact that the preparation of copolymers with β-propiolactones and monomers which were characterized by a very rapid cationic homopolymerization was extremely difficult yielding inevitably a mixture of homopolymers, it was considered that the copolymerization of DMOE with β-propiolactone or pivalolactone would fail. This is reinforced by the fact that attempts to polymerize DMOE with isobutylene, methylmethacrylate and butadiene also failed. Additionally, attempts to polymerize DMOE with β-propiolactone or pivalolactone in the presence of Lewis acids, such as borontrifluoride etherate or tintetrachloride resulted in pure DMOE only.

It, therefore, became desirable to provide a means by which DMOE could be copolymerized with β-lactone. It became desirable to provide a water insoluble copolymer of DMOE since homopolymers of DMOE are water-soluble in the osmotic average number molecular weight range of between about 60,000 and 350,000.

SUMMARY OF THE INVENTION

The long felt desideratum in the prior art is satisfied by a copolymer of 1,2-dimethoxyethylene and a cyclic compound having an oxygen atom as a component of the chain, said copolymer having the formula

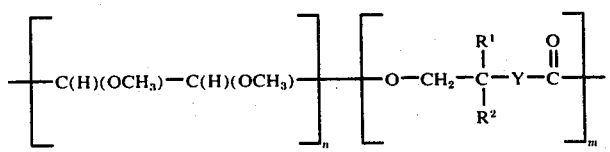

wherein Y is a straight bond or —CH$_2$—O—, R$^1$ and R$^2$ are independently hydrogen or alkyl of 1-4 carbon atoms, $n$ and $m$ are integers, $n + m = 10$ to 1,000.

The copolymers described above are provided by a process which comprises contacting 1,2-dimethoxyethylene under polymerization conditions with a cyclic organic compound having oxygen in the ring, said compound selected from the group consisting of β-lactones and cyclic six-membered ring carbonates in the presence of an initiator in an amount between 0.1 and 10 mole percent based upon the mixture of said 1,2-dimethoxyethylene and said cyclic organic compound, which initiator is of the group of halogen-containing organoaluminum compounds having the following formula:

$$Al(R)_a X_b$$

wherein R is a saturated aliphatic radical of from about 1 to 6 carbon atoms, or phenyl, X is chlorine or bromine, $a + b$ are each 1, 1.5 or 2, the sum of $a + b$ being 3.

Copolymers of DMOE are provided, in accordance with the present invention, by the combined use of a β-lactone and the indicated halogen containing organic aluminum compounds or by the use of a cyclic six-membered carbonate also in admixture with an organoaluminum compound.

Suitable β-lactones in this connection are the unsubstituted β-propiolactone, as well as the α,α-dialkyl-substituted β-propiolactones with lower alkyl residues of up to $C_4$, especially the α,α-dimethyl-β-propiolactone (pivalolactone) and α,α-diethyl-β-propiolactone.

These β-lactones have the formula

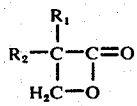

wherein $R_1$ and $R_2$ are each independently hydrogen or an alkyl group of 1 to 4 carbon atoms.

Copolymers of cyclic six-membered carbonates have been produced heretofore only with monomers polymerizing under ring opening, e.g., lactones. Dutch Laid-Open Application 64 -11214 disclose the copolymerization of dimethyldioxacyclohexanone with lactones in the presence of anionic initiators.

It was found that it is indeed possible to obtain copolymers in the copolymerization of DMOE with cyclic six-membered ring carbonates with the use of halogen-containing organoaluminum compounds.

Suitable cyclic carbonates are the unsubstituted 2,6-dioxacyclohexanone, as well as the derivatives thereof mono- or dialkyl-substituted in the 4-position, with lower alkyl residues of up to $C_4$, preferably 4,4-dimethyl-2,6-dioxacyclohexanone.

The novel copolymers of the present invention are produced employing a ratio of 1,2-dimethoxyethylene to β-lactone or cyclic six-membered carbonate in the molar ratio of 1/100 to 100/1. The final copolymer will contain the units corresponding to the monomer in direct proportion to the number of monomeric units employed. Thus, the ratio $n/m$ in the polymer formula set forth above is between 1:100 and 100:1. Similarly, the copolymerization process can be carried out employing a ratio of 1,2-dimethoxyethylene to cyclic compound having oxygen atom of between 1/100 and 100/1. The ratio $n/m$ of DMOE and β-lactones preferably range between 60/40 and 95/5. The ratio of DMOE and cyclic carbonates is preferably between 2/100 and 70/30.

While poly-DMOE is a hard and brittle polymer, these properties can be extensively modified by the combined polymerization with β-lactones or cyclic carbonates. Depending on the type and amount of the thus-included comonomers, it is possible to obtain horn-like, waxy, or rubbery products. Whereas pure poly-DMOE is water-soluble, a copolymer with 84 molar percent of DMOE and 16 molar percent of pivalolactone basic building blocks is water insoluble and thus better suitable for many fields of application. Another positive change in the property spectrum of poly-DMOE is that the polymer loses its brittleness due to the incorporation of the comonomers. Films of a poly-DMOE are brittle and prone to breaking upon flexing at a molecular weight of the polymer below 100,000. In contrast thereto, by the incorporation of 10 molar percent of pivalolactone, bending-resistant films are already obtained at a molecular weight of the copolymer of 50,000.

A disadvantage of the poly-DMOE homopolymer is the strong water absorption when in contact with atmospheric humidity. This absorption amounts to about 18% by weight at a relative atmospheric humidity of 90%. Under the same conditions, a copolymer with 20 molar percent of pivalolactone basic building blocks absorbs only 6% of moisture. A superior property displayed by the copolymers of DMOE and β-lactones or cyclic carbonates is the excellent adhesion to glass, making the products suitable as glass fusion adhesives.

Copolymers of DMOE and lactone or cyclic six-membered carbonate of the present invention can be employed as fusion adhesives. These materials can disposed between an inorganic surface and a substrate and they can be heated until the composition softens. Pressure can be applied to the inorganic surface whereby the inorganic surface and the substrate are glued together by the use of the fusion composition. For instance, a copolymer of DMOE and pivalolactone containing 16 molar percent of monomeric units corresponding to pivalolactone provides an excellent fusion adhesive for glass compositions. Additionally, the glued location has a tensile strength of greater than 50 kiloponds per $cm^2$.

DESCRIPTION OF PREFERRED EMBODIMENTS

As indicated above the polymerization of DMOE can take place with either β-lactones or cyclic six-membered ring carbonates. If the DMOE is copolymerized with a β-lactone the resultant copolymer has the following formula:

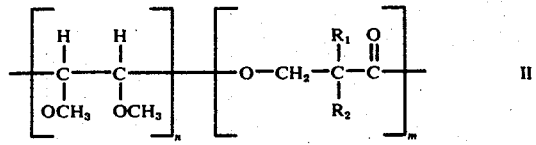

On the other hand, if the DMOE is copolymerized with a cyclic six-membered ring carbonate the resultant copolymer has the following formula:

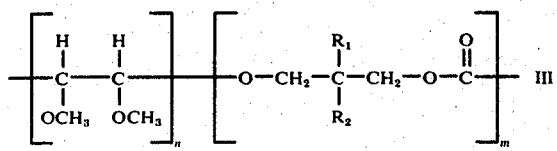

It should be understood that polymerization in accordance with the invention can take place using either form of 1,2-dimethoxyethylene. Both the cis and transforms can be employed equally. Indeed, any mixture of the cis and transform can be employed. Generally speaking, in addition to the use of either a cis or transform alone, a mixture of cis and transforms containing between 5 and 95% of the cis formed can be utilized. Copolymerization proceeds independently of the nature of the structural isomers of the 1,2-dimethoxy ethylene.

In the copolymerization with the cyclic carbonates, mixtures of polymers can be obtained, as can be determined by fractionation; however this does not impair the use thereof.

Another object of this invention is a process for the preparation of these copolymers under the effect of halogen-containing organoaluminum compounds as initiators.

Suitable initiators for triggering the copolymerization are halogen-containing organoaluminum compounds of the formula:

$$Al\ R_a\ X_b$$

wherein R is a saturated, optionally branched aliphatic or an aromatic hydrocarbon residue of up to 6 carbon atoms, and X is a halogen, especially chlorine or bromine; $a$ and $b$ are integers and can assume the values of 1 or 2. The sum of $a + b$ corresponds to the valence of the aluminum. Mixtures of organoaluminum compounds of the aforementioned formula (alkylaluminum sesquihalides) can also be employed. Preferred initiators are, for example: dimethylaluminum chloride, dimethylaluminum bromide, diethylaluminum chloride, diethylaluminum bromide, diisobutylaluminum chloride, diphenylaluminum chloride, methylaluminum sesquichloride, ethylaluminum dichloride, ethylaluminum sesquichloride, and phenylaluminum dichloride.

The initiators are employed in concentrations of between 0.1 and 10 molar percent, preferably between 0.5 and 5 molar percent, based on the total amount of the monomer mixture. The copolymerization takes place preferably in the absence of solvents; however, it is also possible to polymerize in the presence of inert solvents, e.g., aromatic hydrocarbons.

The polymerization temperature can range between −80° and +100°C., preferably between −60° and +80°C. The copolymerization of DMOE with the β-lactones is conducted particularly advantageously below room temperature in the range from −60°C. to +10°C., the polymerization of DMOE with the cyclic carbonates is accomplished especially advantageously at room temperature or thereabove in the range from +15°C. to +80°C.

In order to more fully illustrate the nature of the invention and manner of practicing the same, the following examples are presented:

EXAMPLE 1

Under a nitrogen atmosphere, 44 g. (0.5 mole) of DMOE and 50 g. (0.5 mole) of pivalolactone are charged into a reactor equipped with an agitator and a gas feed pipe. After the monomer mixture has been cooled to −20°C., 2.4 g. (0.02 mole) of diethylaluminum chloride in the form of a 30% solution in toluene is added thereto under agitation. The initiator concentration is 2 molar percent. Within the next few hours, the viscosity of the polymerizing mixture increases greatly, and after 7 hours, the polymerization is stopped by adding 5 ml. of methanol; the mixture is diluted with 30 ml. of chloroform, and the viscous polymer solution is precipitated by pouring into petroleum ether. The polymer is purified by reprecipitation from chloroform into petroleum ether. After drying, 61.2 g. of a colorless, horn-like copolymer is obtained. The conversion is 65%. The IR spectrum shows the C=O valence oscillation of the basic building block pivalolactone at 1725 cm$^{-1}$ and the CH harmonic of the methoxy group of the basic building block DMOE at 2900 cm$^{-1}$. The solubility of the product in chloroform likewise speaks for a copolymer; in case of a polymer mixture, the proportion of polypivalolactone would be insoluble in chloroform.

On the basis of the proton ratio determined in the NMR spectrum, the proportion of the basic components of pivalolactone in the copolymer is 16.4 molar percent. The molecular weight of the copolymer, determined by osmotic pressure (average number), is 45,000. The softening temperature is 100°C. The copolymer is soluble in chloroform, acetone, tetrahydrofuran (THF), and dioxane; it is insoluble in water and methanol.

Two glass plates, each having a thickness of 1 mm., are glued together after applying the molten [fused] copolymer at 150°C. (area of adhesion: 4 cm²), and the tensile strength of the glued location is measured at a pull-off speed of 5 mm./min. At a load of 215 kp., a breakage occurred in front of the glued location. The tensile strength was ≥ 53 kp./cm².

EXAMPLE 2

Under a nitrogen atmosphere, 23 g. (0.26 mole) of DMOE and 50 g. (0.5 mole) of pivalolactone are charged into a polymerization reactor. The molar ratio of the monomers is 35/65. After cooling to polymerization temperature of −15°C., 1.9 g. (0.015 mole) of monoethylaluminum dichloride in the form of a solution in toluene (30%) is added thereto under agitation. The amount of initiator is 2 molar percent. After 7 hours, the polymerization is stopped by the addition of 5 ml. of methanol, and the copolymer, after dilution with 30 ml. of chloroform, is precipitated in petroleum ether. After re-precipitation from CHCl$_3$/petroleum ether, 53 g. of a rubbery copolymer is obtained. On the basis of quantitative IR analysis (reference bands:>C=O valence oscillation of the basic pivalolactone building block and CH harmonic of the CH$_3$—O—group in the DMOE basic building block), the copolymer has 25 molar percent of basic pivalolactone building blocks. The conversion is 72%. The copolymer has an average number molecular weight of 42,000, determined by osmotic pressure.

EXAMPLE 3

Under a nitrogen atmosphere, 26.4 g. (0.3 mole) of DMOE and 21.6 g. (0.3 mole) of β-propiolactone are introduced into a polymerization reactor. After cooling the monomer mixture to the polymerization temperature of −15°C., 1.0 g. of ethylaluminum sesquichloride in the form of a 25% solution in toluene is added thereto under agitation. After 6 hours, the polymerization is stopped by the addition of 6 ml. of methanol, and the polymer, after diluting the batch with 15 ml. of chloroform, is precipitated by pouring into petroleum ether. After purification by means of reprecipitation, 36 g. of a wax-like copolymer is obtained having a softening temperature of 60°C. The conversion is 75%. The copolymer contains 12 molar percent of β-lactone basic building blocks on the basic of NMR analysis and is soluble in most of the organic solvents; it is insoluble in methanol and water. The molecular weight, determined by osmotic membrane, is 48,000.

EXAMPLE 4

Under a nitrogen atmosphere, 17.6 g. (0.2 mole) of DMOE and 80 g. (0.8 mole) of pivalolactone are introduced into the polymerization reactor described in Example 1. After cooling the monomer mixture to the polymerization temperature of −20°C., 3.6 g. (0.03 mole) of diethylaluminum monochloride as a solution in toluene is added thereto under agitation. After 8 hours, the batch has turned viscous. The polymerization is stopped; the polymer is precipitated by pouring the batch mixture into petroleum ether and reprecipitated from chloroform/petroleum ether, thus obtaining 26 g. of a horn-like polymer. The conversion is 26.6%. The IR spectrum shows the already indicated oscillations of the basic components at 1720 cm$^{-1}$ and 2900 cm$^{-1}$. The copolymer is soluble in methylene chloride, chloroform, acetone, dimethylformamide, THF, and dioxane, but insoluble in water and methanol.

On the basis of the proton ratio determined in the NMR spectrum, the proportion of the basic pivalolactone building blocks is 41 molar percent. The average number molecular weight, determined by osmotic membrane, is 16,000.

EXAMPLE 5

Under a nitrogen atmosphere, 22 g. (0.25 mole) of DMOE and 32.5 g. (0.25 mole) of 4,4-dimethyl-2,6-dioxacyclohexanone are introduced into a polymerization reactor. Under agitation at room temperature, 1.2 g. (0.01 mole) of diethyl-aluminum chloride is added thereto, the batch is heated to the polymerization temperature of 60°C. and left at this temperature for 15 hours. The solidified reaction mixture is dissolved in moist chloroform and precipitated in petroleum ether. After drying, a horn-like copolymer is obtained having a softening range of 80°–90°C. This product is soluble in chloroform and furthermore in several other organic solvents, such as acetone, methylene chloride, tetrahydrofuran, and dioxane. It is insoluble in water and methanol. As per the chemical shift and the intensity of the signals in the NMR spectrum, a copolymer has been produced having a proportion of 68.6 molar percent of dimethyldioacyclohexanone basic building blocks. The weight loss on the thermobalance (heating rate 8°C./min. under an air atmosphere) is 1% at 235°C., 5% at 295°C., and 10% at 324°C. The molecular weight (determined by osmotic membrane) is 17,000.

EXAMPLES 6, 7, AND 8

Differing amounts of 2,6-dioxacyclohexanone (DOC) are dissolved in DMOE, combined at room temperature with respectively 2 molar percent of diethylaluminum monochloride as the initiator, and heated to the polymerization temperature of 50°C. After respectively 15 hours, the solidified batches are dissolved in chloroform, precipitated in petroleum ether, and reprecipitated from chloroform in petroleum ether.

In the NMR spectra, the signals of the protons of the basic DMOE building block occur (methine and methyl protons are combined in a broad peak with a maximum at $d = 3.57$ p.p.m.), as well as the signals of the methylene protons of the basic DOC component at $d = 2.06$ p.p.m. (quintet) and $d = 4.23$ p.p.m. (triplet). The proportion of the DMOE basic building blocks (DMOE-BBB) is determined on the basis of the intensity relationship of the signals of the basic DMOE and DOC components, respectively.

|  | DMOE g. | DOC g. | DMOE/DOC (1) | Polymer g. | Conversion % by wt. | DMOE-BBB(2) molar % |
|---|---|---|---|---|---|---|
| Example 6 | 22 | 25.5 | 50/50 | 26.6 | 56 | 23 |
| 7 | 8.8 | 30.6 | 25/75 | 26.1 | 66 | 11.5 |
| 8 | 26.4 | 10.2 | 75/25 | 9.7 | 26.5 | 53 |

(1)Molar ratio in the monomer mixture
(2)Proportion in copolymer

The copolymers are soluble in numerous solvents, such as halogenated hydrocarbons, DMF, THF, dioxane, and acetone,. They are insoluble in aliphatic hydrocarbons. With the use of water at room temperature, the products of Examples 6–8 can be separated into a water-soluble and a water-insoluble proportion. The water-soluble proportion, in the polymer of Example 6, is about 8%, of Example 7 about 2.4%, and of Example 8 about 60%. The possibility of fractionating the polymers due to varying degrees of water solubility leads to the conclusion that mixtures of the copolymers have been produced.

The copolymer of Example 8 is plastic at room temperature: the products of Examples 6 and 7 are horn-like masses which soften in a temperature range of 50°–70°C. The molecular weights of the polymers, determined by osmotic membrane, in Examples 6, 7 and 8 are 9,000, 17,000, and 7,000, respectively.

As indicated above, the copolymers of the invention generally have an average number molecular weight determined by use of osmotic pressure of at least 1,000. However, the molecular weight can be as high as blank. Preferably, the copolymers of the invention have an average number molecular weight, determined by osmotic pressure, between 5,000 and 80,000.

The copolymers have been described as being water-insoluble. They are also insoluble in methanol. By the term "water insoluble" is meant that when 10 gms. of copolymer are placed into 1,000 cc. of water at room temperature, no more than 5 % of the copolymer on a weight basis dissolved in the water. Similarly, no more than 8 % of the copolymer is soluble in methanol at room temperature. However, the copolymer is generally soluble in methylene chloride, chloroform, acetone, dimethyl formamide, tetrahydrofuran and dioxane. By this is meant that at least 95 % of the copolymer is soluble in 1,000 cc. of such solvent at room temperature.

What is claimed is:

1. A copolymer of 1,2-dimethoxyethylene and a β-lactone as a component of the chain, said copolymer having the formula:

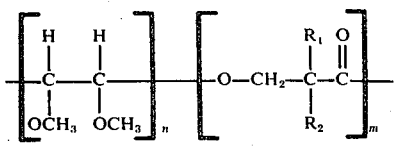
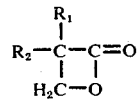

wherein n and m are integers, n+m equals 10 to 1,000 and n/m is between 1/100 and 100/1, $R_1$ and $R_2$ are independently hydrogen or alkyl of 1 to 4 carbon atoms.

2. A copolymer according to claim 1 having an osmotic average number molecular weight of at least 1,000.

3. A copolymer according to claim 1 having an osmotic average number molecular weight of between 1,000 and 100,000.

4. A copolymer according to claim 1 wherein at least $R^1$ or $R^2$ is alkyl.

5. A copolymer according to claim 1 wherein $R^1$ and $R^2$ are methyl.

6. A copolymer according to claim 1 wherein $R^1$ and $R^2$ are ethyl.

7. A copolymer according to claim 1 wherein $R^1$ and $R^2$ are hydrogen.

8. A copolymer according to claim 2 which is water insoluble.

9. A copolymer according to claim 2 which is flexible without breaking.

10. A copolymer according to claim 2 having a tensile strength of at least 50 kiloponds per cm².

11. A process for preparing the copolymer of claim 1 which comprises contacting 1,2-dimethoxyethylene under copolymerization conditions with a β-lactone having the formula wherein $R_1$ and $R_2$ are each independently selected from the group consisting of hydrogen and alkyl of 1 to 4 carbon atoms, in the presence of an initiator in an amount of between 0.1 and 10 mole percent based upon the mixture of said 1,2-dimethoxyethylene and said β-lactone, which initiator is of the group of halogen-containing organo aluminum compounds having the formula:

$$Al(R)_a X_b$$

wherein R is a saturated aliphatic radical of from about 1 to 6 carbon atoms, or phenyl, X is chlorine or bromine, a and b are each 1, 1.5 or 2, the sum of a + b being 3.

12. A process according to claim 11 wherein said initiator is present in a molar amount of between 0.5 and 5 mols based upon the mixture of said 1,2-dimethoxyethylene and said "β-lactone".

13. A process according to claim 11 wherein said initiator is selected from the group consisting of dimethylaluminum chloride, dimethylaluminum bromide, diethylaluminum chloride, diethylaluminum bromide, ethylaluminum dichloride and ethylaluminum sesquichloride.

14. A process according to claim 11 wherein the copolymerization is conducted in a solvent of the comonomers.

15. A process according to claim 11 wherein the copolymerization is conducted at a temperature between −60° and +80°C.

16. A process according to claim 11 wherein the copolymerization is carried out at a temperature of between −60° and +10°C.

17. A process according to claim 11 wherein the β-lactone is selected from the group consisting of propiolactone, pivalolactone and α,α-diethyl-β-propiolactone.

* * * * *

UNITED STATES PATENT AND TRADEMARK OFFICE
CERTIFICATE OF CORRECTION

PATENT NO. : 3,976,623
DATED : August 24, 1976
INVENTOR(S) : Norbert Vollkommer

It is certified that error appears in the above-identified patent and that said Letters Patent are hereby corrected as shown below:

Column 5, line 49, change "polymerization" to --copolymerization--.

Column 7, beneath the table, note (2), before "Proportion" insert --DMOE-basic building blocks,--.

Signed and Sealed this

Eighth Day of February 1977

[SEAL]

Attest:

RUTH C. MASON
Attesting Officer

C. MARSHALL DANN
Commissioner of Patents and Trademarks